(12) United States Patent
Romanelli et al.

(10) Patent No.: US 9,315,725 B2
(45) Date of Patent: Apr. 19, 2016

(54) METHOD OF MAKING EU$^{2+}$ ACTIVATED INORGANIC RED PHOSPHOR

(71) Applicants: Lightscape Materials, Inc., Princeton, NJ (US); Dow Global Technologies LLC, Midland, MI (US)

(72) Inventors: Michael Dennis Romanelli, East Brunswick, NJ (US); Alan C. Thomas, Yardley, PA (US); Mary Anne Leugers, Midland, MI (US); Yongchi Tian, Princeton Junction, NJ (US)

(73) Assignees: Lightscape Materials, Inc., Princeton, NJ (US); Dow Global Technologies LLC, Midland, MI (US)

( * ) Notice: Subject to any disclaimer, the term of this patent is extended or adjusted under 35 U.S.C. 154(b) by 99 days.

(21) Appl. No.: 14/471,714

(22) Filed: Aug. 28, 2014

(65) Prior Publication Data

US 2016/0060515 A1 Mar. 3, 2016

(51) Int. Cl.
*C09K 11/59* (2006.01)
*C09K 11/77* (2006.01)

(52) U.S. Cl.
CPC .................................. *C09K 11/7734* (2013.01)

(58) Field of Classification Search
CPC .................... C09K 11/7728; C09K 11/7734
See application file for complete search history.

(56) References Cited

U.S. PATENT DOCUMENTS

| | | | |
|---|---|---|---|
| 5,543,080 A * | 8/1996 | Iwase | C09K 11/7731 252/301.4 H |
| 5,635,110 A * | 6/1997 | Chadha | C09K 11/773 252/301.4 R |
| 7,138,756 B2 | 11/2006 | Gotoh et al. | |
| 7,252,788 B2 | 8/2007 | Nagatomi et al. | |
| 7,258,816 B2 | 8/2007 | Tamaki et al. | |
| 7,273,568 B2 | 9/2007 | Nagatomi et al. | |
| 7,276,183 B2 * | 10/2007 | Tian | C09K 11/7731 252/301.4 F |
| 7,391,060 B2 | 6/2008 | Oshino | |
| 7,432,647 B2 | 10/2008 | Nagatomi et al. | |
| 7,445,730 B2 | 11/2008 | Nagatomi et al. | |
| 7,476,335 B2 | 1/2009 | Sakane et al. | |
| 7,476,338 B2 | 1/2009 | Sakane et al. | |
| 7,556,744 B2 | 7/2009 | Tamaki et al. | |
| 7,597,823 B2 | 10/2009 | Tamaki et al. | |
| 7,713,442 B2 * | 5/2010 | Tian | C09K 11/7734 252/301.4 H |
| 7,713,443 B2 | 5/2010 | Hirosaki et al. | |
| 7,723,740 B2 | 5/2010 | Takashima et al. | |
| 7,811,472 B2 | 10/2010 | Oshio | |
| 7,833,436 B2 * | 11/2010 | Shimooka | C09K 11/0883 252/301.4 F |
| 7,902,564 B2 | 3/2011 | Mueller-Mach et al. | |
| 7,938,983 B2 | 5/2011 | Mueller-Mach et al. | |
| 7,964,113 B2 | 6/2011 | Tamaki et al. | |
| 8,007,683 B2 | 8/2011 | Starick et al. | |
| 8,105,502 B2 | 1/2012 | Fukuda et al. | |
| 8,119,028 B2 | 2/2012 | Le Toquin | |
| 8,148,887 B2 | 4/2012 | Hirosaki et al. | |
| 8,159,126 B2 | 4/2012 | Schmidt et al. | |
| 8,206,611 B2 | 6/2012 | Hirosaki et al. | |
| 8,277,687 B2 * | 10/2012 | Takahashi | C09K 11/584 252/301.4 H |
| 8,535,566 B2 | 9/2013 | Li et al. | |
| 8,536,777 B2 | 9/2013 | Li et al. | |
| 8,551,360 B2 | 10/2013 | Duan et al. | |
| 8,704,255 B2 | 4/2014 | Kim et al. | |
| 8,815,121 B2 | 8/2014 | Li et al. | |
| 9,200,199 B1 * | 12/2015 | Romanelli | C09K 11/7734 |
| 2007/0007494 A1 | 1/2007 | Hirosaki et al. | |
| 2009/0283721 A1 | 11/2009 | Liu et al. | |
| 2010/0213489 A1 | 8/2010 | Kim et al. | |
| 2010/0213822 A1 | 8/2010 | Shimooka et al. | |
| 2010/0288972 A1 | 11/2010 | Roesler et al. | |
| 2011/0204769 A1 | 8/2011 | Fukuda et al. | |
| 2011/0279016 A1 | 11/2011 | Li et al. | |
| 2011/0279017 A1 | 11/2011 | Li et al. | |
| 2013/0207536 A1 | 8/2013 | Li et al. | |
| 2013/0207537 A1 * | 8/2013 | Li | H01L 33/502 313/503 |
| 2013/0313966 A1 | 11/2013 | Kim et al. | |
| 2014/0015400 A1 | 1/2014 | Li et al. | |
| 2014/0062287 A1 | 3/2014 | Li et al. | |

OTHER PUBLICATIONS

Copending U.S. Appl. No. 14/471,571.
Copending U.S. Appl. No. 14/471,607.

* cited by examiner

*Primary Examiner* — Carol M Koslow
(74) *Attorney, Agent, or Firm* — Thomas S. Deibert

(57) ABSTRACT

A method of manufacturing an Eu$^{2+}$ activated inorganic red phosphor is provided, wherein the phosphor exhibits an emission spectrum resolvable into a first Gaussian emission curve and a second Gaussian emission curve; wherein the first Gaussian emission curve has a first Gaussian emission curve peak, $P_1$; wherein the first Gaussian emission curve peak, $P_1$, has a peak 1 height, $H_{P1}$, a peak 1 peak wavelength, $P\lambda_{P1}$, and a peak 1 area, $A_{P1}$; wherein the second Gaussian emission curve has a second Gaussian emission curve peak, $P_2$; wherein the second Gaussian emission curve peak, $P_2$, has a peak 2 height, $H_{P2}$, a peak 2 peak wavelength, $P\lambda_{P2}$, a peak 2 full width at half max, $FWHM_{P2}$, and a peak 2 area, $A_{P2}$; wherein $P\lambda_{P1} < P\lambda_{P2}$; and, wherein the peak 2 full width at half max, $FWHM_{P2}$, is minimized.

5 Claims, No Drawings

METHOD OF MAKING EU$^{2+}$ ACTIVATED INORGANIC RED PHOSPHOR

The present invention relates to a method of manufacturing an Eu$^{2+}$ activated inorganic red phosphor, wherein the phosphor exhibits an emission spectrum resolvable into a first Gaussian emission curve and a second Gaussian emission curve; wherein the first Gaussian emission curve has a first Gaussian emission curve peak, $P_1$; wherein the first Gaussian emission curve peak, $P_1$, has a peak 1 height, $H_{P1}$, a peak 1 peak wavelength, $P\lambda_{P1}$, and a peak 1 area, $A_{P1}$; wherein the second Gaussian emission curve has a second Gaussian emission curve peak, $P_2$; wherein the second Gaussian emission curve peak, $P_2$, has a peak 2 height, $H_{P2}$, a peak 2 peak wavelength, $P\lambda_{P2}$, a peak 2 full width at half max, $FWHM_{P2}$, and a peak 2 area, $A_{P2}$; wherein $P\lambda_{P1} < P\lambda_{P2}$; and, wherein the peak 2 full width at half max, $FWHM_{P2}$, is minimized.

Phosphor-converted LEDs (pcLEDs) utilize a blue LED chip as a light source and one or more phosphors to produce white light. Devices based on pcLED technology are poised to become fundamental devices for general use in solid state lighting applications. Nevertheless, significant advances are required in order to achieve the performance specifications set by the solid state lighting market.

The pcLED devices create their white light emissions from a single LED by exciting the included phosphor(s) using the emission spectrum produced by the blue LED chip. The emission spectrum produced by the blue LED chip excites the included phosphor(s) which then produce an emission spectrum that combines with that of the blue LED chip to yield white light. It is important to recognize that color tuning of the blue LED chip and the included phosphor(s) is critical for the effectiveness and optimization of the pcLED devices. Accordingly, there is a continuing need for phosphor development to provide pcLED device manufactures with enhanced color tuning capabilities.

Also, the phosphors used in conventional pcLED device designs are located in close proximity to the blue LED light source. As a result, during light generation these phosphors are subjected to elevated temperatures. The junction temperatures exhibited by high power LED chips are typically in the range of 100 to 150° C. At such elevated temperatures, the crystal of the phosphors are at a high vibrationally excited state. When placed in such a high vibrationally excited state, the excitation energy can result in the generation of additional heat through non-luminescent relaxation rather than resulting in the desired luminescence emission from the phosphor. This heat generation exacerbates the situation resulting in a vicious cycle that contributes to the inability of current pcLED devices to achieve the industry established performance specifications for the solid state lighting market. Accordingly, successful development of pcLED devices for general illumination requires the identification of phosphors that can operate highly efficiently at temperatures of 100 to 150° C.

Nitride based phosphors have been proposed for use in pcLED devices because of their excellent luminescence performance at the high temperatures developed in pcLED devices. Examples of such nitride based phosphors include metal silicon nitride based phosphors. The host crystals of these phosphor materials consist mainly of chemical bonds of Si—N, Al—N, as well as hybrid bonds thereof, as the backbone of the structure. While these bonds are stable, the chemical bond between silicon and carbon (Si—C) has a higher bond energy, and therefore higher thermal and chemical stability. Furthermore, carbon forms very stable chemical bonds with many metal atoms.

Carbidonitride phosphors can be comprised of carbon, silicon, germanium, nitrogen, aluminum, boron and other metals in the host crystal and one or more metal dopants as a luminescent activator. This class of phosphors has recently emerged as a color converter capable of converting near UV (nUV) or blue light to other light in the visible spectral range, e.g., blue, green, yellow, orange and red light. The host crystal of carbidonitride phosphors is comprised of —N—Si—C—, —N—Si—N—, and —C—Si—C— networks in which the strong covalent bonds of Si—C and Si—N serve as the main building blocks of the structure.

In certain carbidonitride phosphors, the carbon can enhance, rather than quench, the luminescence of the phosphor, in particular when the phosphor is subjected to relatively high temperatures (e.g. 200° C. to 400° C.). The reflectance of certain silicon carbidonitride phosphors in the wavelength range of the desired emission spectrum increases as the amount of carbon increases. These carbidonitride phosphors have been reported to exhibit excellent thermal stability of emission and high emission efficiency.

One family of carbidonitride based phosphors designed for use in pcLED devices is disclosed in U.S. Pat. No. 8,535,566 to Li et al. Li et al. describe stoichiometric silicon carbidonitride phosphors and light emitting devices which utilize the same, wherein the family of carbidonitride based phosphors are expressed as follows:

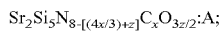

wherein $0 < x \leq 5$, $0 \leq z \leq 3$, and $((4x/3)+z) < 8$;

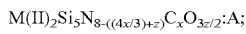

wherein $0 < x \leq 5$, $0 \leq z \leq 3$, and $((4x/3)+z) < 8$;

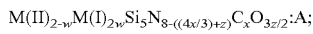

wherein $0 < x \leq 5$, $0 \leq w \leq 0.6$, $0 \leq z \leq 3$, and $((4x/3)+z) < 8$;

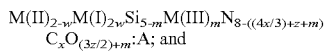

wherein $0 < x \leq 5$, $0 \leq w \leq 0.6$, $0 \leq z \leq 3$, $0 \leq m < 2$, and $((4x/3)+z+m) < 8$;

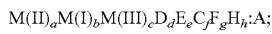

wherein $0 < a < 2$, $0 \leq b \leq 0.6$, $0 \leq c < 2$, $0 < d \leq 5$, $0 < e \leq 8$, $0 < f \leq 5$, $0 \leq g < 2.5$, and $0 \leq h < 0.5$.

wherein M(II) is at least one divalent cation; wherein M(I) is at least one monovalent cation; M(III) is at least one trivalent cation; wherein D is at least one tetravalent cation; wherein E is at least one trivalent anion; wherein F is at least one divalent anion; wherein H is at least one monovalent anion; and, wherein A is a luminescence activator doped in the crystal structure.

Notwithstanding, there is a continuing need for phosphors that provide pcLED device manufactures with enhanced color tuning capabilities and methods of making the same. Particularly, there is a continuing need for a method of making red phosphor offerings that exhibit tunable emission spectra having an overall emission peak wavelength of between 600 nm and 660 nm coupled with a high luminescence efficiency and low thermal quenching.

The present invention provides a method of manufacturing an Eu$^{2+}$ activated inorganic red phosphor, comprising: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the Eu$^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. for a period of 2 to 36 hours, then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. for a period of 2 to 36 hours, then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace; (xix) repeating steps (xi) through (xiii) zero to three times; and, (xx) removing and grinding the contents of the firing container from step (xix) to provide an $Eu^{2+}$ activated inorganic red phosphor.

The present invention provides a method of manufacturing an $Eu^{2+}$ activated inorganic red phosphor, comprising: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the $Eu^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. for a period of 2 to 36 hours, then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. for a period of 2 to 36 hours, then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace; (xix) repeating steps (xi) through (xiii) zero to three times; (xx) removing and grinding the contents of the firing container from step (xix) to provide an $Eu^{2+}$ activated inorganic red phosphor; and, (xxi) washing the $Eu^{2+}$ activated inorganic red phosphor.

The present invention provides a method of manufacturing an $Eu^{2+}$ activated inorganic red phosphor, comprising: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the $Eu^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. for a period of 2 to 36 hours, then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. for a period of 2 to 36 hours, then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace; (xix) repeating steps (xi) through (xiii) zero to three times; (xx) removing and grinding the contents of the firing container from step (xix) to provide an $Eu^{2+}$ activated inorganic red phosphor; (xxi) washing the $Eu^{2+}$ activated inorganic red phosphor; (xxii) providing a surface treating material; and, (xxiii) applying the surface treating material to a surface of the $Eu^{2+}$ activated inorganic red phosphor.

The present invention provides a method of manufacturing an $Eu^{2+}$ activated inorganic red phosphor, comprising: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the $Eu^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. for a period of 2 to 36 hours, then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. for a period of 2 to 36 hours, then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace; (xix) repeating steps (xi) through (xiii) zero to three times; (xx) removing and grinding the contents of the firing container from step (xix) to provide an $Eu^{2+}$ activated inorganic red phosphor; (xxi) washing the $Eu^{2+}$ activated inorganic red phosphor; providing a liquid carrier; and, dispersing the $Eu^{2+}$ activated inorganic red phosphor in the liquid carrier to form a phosphor composition.

The present invention provides a method of manufacturing an $Eu^{2+}$ activated inorganic red phosphor, comprising: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the $Eu^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. for a period of 2 to 36 hours, then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. for a period of 2 to 36 hours, then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace; (xix) repeating steps (xi) through (xiii) zero to three times; (xx) removing and grinding the contents of the firing container from step (xix) to provide an $Eu^{2+}$ activated inorganic red phosphor; (xxi) washing the $Eu^{2+}$ activated inorganic red phosphor; providing a liquid carrier; dispersing the $Eu^{2+}$ activated inorganic red phosphor in the liquid carrier to form a phosphor composition; providing an additive; and, incorporating the additive into the phosphor composition.

DETAILED DESCRIPTION

The term "$ES_{455}$" as used herein and in the appended claims is the emission spectrum exhibited by a given luminescent material upon excitation with monochromatic light having a wavelength of 455 nm.

The term "$ES_{453}$" as used herein and in the appended claims is the emission spectrum exhibited by a given luminescent material upon excitation with monochromatic light having a wavelength of 453 nm.

The terms "first Gaussian emission curve" and "second Gaussian emission curve" as used herein and in the appended claims refer to two Gaussian emission curves resolved using GRAMS peak fitting software with 2 symmetric Gaussian bands from the emission spectrum, $ES_{455}$, exhibited by a given luminescent material upon excitation with monochromatic light having a wavelength of 455 nm observed using a spectrometer having a spectral resolution of ≤1.5 nm.

The term "first Gaussian emission curve peak" as used herein and in the appended claims is the peak of the first Gaussian emission curve at a higher energy relative to the second Gaussian emission curve peak.

The term "peak 1 height" or "$H_{P1}$" as used herein and in the appended claims is the height of the first Gaussian emission curve at the first Gaussian emission curve peak.

The term "peak 1 peak wavelength" or "$P\lambda_{P1}$" as used herein and in the appended claims is the wavelength corresponding to the first Gaussian emission curve peak.

The term "peak 1 area" or "$A_{P1}$" as used herein and in the appended claims is the area under the first Gaussian emission curve peak.

The term "second Gaussian emission curve peak" as used herein and in the appended claims is the peak of the second Gaussian emission curve at a lower energy relative to the first Gaussian emission curve peak.

The term "peak 2 height" or "$H_{P2}$" as used herein and in the appended claims is the height of the second Gaussian emission curve at the second Gaussian emission curve peak.

The term "peak 2 peak wavelength" or "$P\lambda_{P2}$" as used herein and in the appended claims is the wavelength corresponding to the second Gaussian emission curve peak.

The term "peak 2 full width half max" or "$FWHM_{P2}$" as used herein and in the appended claims is the full width at half max of the second Gaussian emission curve, wherein $P\lambda_{P1} < P\lambda_{P2}$.

The term "peak 2 area" or "$A_{P2}$" as used herein and in the appended claims is the area under the second Gaussian emission curve.

The term "peak ratio" or "$P_R$" as used herein and in the appended claims is the ratio of the peak 1 height, $H_{P1}$, to the peak 2 height, $H_{P2}$, as determined by the following equation $$H_R = H_{P1}/H_{P2};$$

wherein $P\lambda_{P1} < P\lambda_{P2}$.

The term "area ratio" or "$A_R$" as used herein and in the appended claims is the ratio of the peak 1 area, $A_{P1}$, to the peak 2 area, $A_{P2}$, as determined by the following equation $$A_R = A_{P1}/A_{P2};$$

wherein $P\lambda_{P1} < P\lambda_{P2}$.

The term "overall full width at half max" or "$FWHM_{overall}$" as used herein and in the appended claims is the full width at half max of the emission spectrum (e.g., $ES_{453}$) exhibited by a given luminescent material upon excitation with a light source (i.e., monochromatic light having a wavelength of 453 nm for $ES_{453}$).

The term "overall peak wavelength" or "$P\lambda_{overall}$" as used herein and in the appended claims is the peak wavelength of the emission spectrum (e.g., $ES_{453}$) exhibited by a given luminescent material upon excitation with a light source (i.e., monochromatic light having a wavelength of 453 nm for $ES_{453}$).

The term "$CIE_X$" as used herein and in the appended claims means the x chromaticity coordinate of an emission spectrum (i.e., $iES_{455}$, $iES_{453}$, $pES_{455}$, or $pES_{453}$) of a luminescent material based on the CIE 1931 Chromaticity Diagram.

The term "$CIE_Y$" as used herein and in the appended claims means the y chromaticity coordinate of an emission spectrum (i.e., $iES_{455}$, $iES_{453}$, $pES_{455}$, or $pES_{453}$) of a luminescent material based on the CIE 1931 Chromaticity Diagram.

The term "virgin material" as used herein and in the appended claims means a material that has not previously been exposed to a silicon source at high temperatures (i.e., >1,000° C.).

It is known that each $Eu^{2+}$ cation incorporated into an inorganic substance generically represented by formula (II)

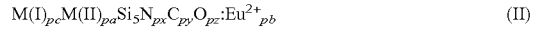

$$M(I)_{pc}M(II)_{pa}Si_5N_{px}C_{py}O_{pz}:Eu^{2+}_{pb} \qquad (II)$$

wherein M(I) is a monovalent species selected from the group consisting of Li, Na, K, F, Cl, Br and I; wherein M(II) is a divalent cation selected from the group consisting of at least one of Mg, Ca, Sr and Ba; wherein $1.7 \leq pa \leq 2$; $0 < pb \leq 0.3$; $0 \leq pc \leq 0.1$; $5 \leq px \leq 8$; $0 \leq py \leq 1.5$; $0 \leq pz \leq 5$; can occupy either a substitutional or interstitial position within the host lattice. For example, the $Eu^{2+}$ cations incorporated into the inorganic substance generically represented by formula (II) can substitute into the host lattice sites otherwise occupied by a M(II) divalent cation (i.e., $Mg^{2+}$, $Ca^{2+}$, $Sr^{2+}$ or $Ba^{2+}$). Such site specific substitution is a result of the $Eu^{2+}$ cation having the same oxidation state as the displaced M(II) divalent cation as well as the $Eu^{2+}$ cation having a similar ionic radii (6-coordinate $Sr^{2+}$, 1.18 Å; 6-coordinate $Eu^{2+}$, 1.17 Å).

The designers of pcLED devices are acutely aware of how the human eye responds to the electromagnetic spectrum and how that response translates into the performance and efficiency of the pcLED devices. That is, the designers of pcLED devices will recognize that the human eye will not be sensitive to emission spectrum emitted from the device that falls outside the area beneath the photopic response curve. Accordingly, these designers will recognize the desirability of phosphors for use in pcLED devices that provide as much emission spectrum under the photopic response curve as possible while still providing suitable color coordinates $CIE_X$ and $CIE_Y$ based on the CIE 1931 Chromaticity Diagram for a given device design. For example, the designers of white light emitting pcLED devices desire red emitting phosphors that provide a maximum red luminescence to enable a high color rendering index (CRI) at a low correlated color temperature (CCT) and with a minimized loss of emission energy into the near infrared spectral region.

It has surprisingly been found that conventional substances generically represented by formula (II) exhibit an emission spectrum, $ES_{455}$, upon excitation with monochromatic light having a wavelength of 455 nm; wherein the emission spectrum, $ES_{455}$, is resolvable into a first Gaussian emission curve and a second Gaussian emission curve; wherein the first Gaussian emission curve has a first Gaussian emission curve peak, $P_1$; wherein the first Gaussian emission curve peak, $P_1$, has a peak 1 height, $H_{P1}$, a peak 1 peak wavelength, $P\lambda_{P1}$, and a peak 1 area, $A_{P1}$; wherein the second Gaussian emission curve has a second Gaussian emission curve peak, $P_2$; wherein the second Gaussian emission curve peak, $P_2$, has a peak 2 height, $H_{P2}$, a peak 2 peak wavelength, $P\lambda_{P2}$, a peak 2 area, $A_{P2}$, and a peak 2 full width half max, $FWHM_{P2}$; wherein $P\lambda_{P1} < P\lambda_{P2}$. It is believed that the first Gaussian emission curve and the second Gaussian emission curve correspond to different positions occupied by the $Eu^{2+}$ in the conventional substances generically represented by formula (II). In view of this realization, it becomes apparent that the modification of these substances to provide a minimized peak 2 full width at half max, $FWHM_{P2}$, can result in a significant increase in the brightness of the light emitted from the modified substances upon excitation with monochromatic light having a wavelength of 455 nm by maximizing the emission in the region visible to the human eye.

Conventional substances generically represented by formula (II) are prepared by firing of the constituent raw material powders in a crucible, wherein the internal surfaces of the crucible coming into contact with the raw material powders have previously been seasoned through repeated exposure to a silicon source at high temperatures. Alternatively, as noted in U.S. Pat. Nos. 8,277,687 and 7,833,436. Also, conventional substances generically represented by formula (II) exhibit an emission spectrum, $ES_{455}$, upon excitation with monochromatic light having a wavelength of 455 nm; wherein the emission spectrum is resolvable into a first Gaussian emission curve and a second Gaussian emission curve; wherein the first Gaussian emission curve has a first Gaussian emission curve peak, $P_1$; wherein the first Gaussian emission curve peak, $P_1$, has a peak 1 height, $H_{P1}$, a peak 1 peak wavelength, $P\lambda_{P1}$, and a peak 1 area, $A_{P1}$; wherein the second Gaussian emission curve has a second Gaussian emission curve peak, $P_2$; wherein the second Gaussian emission curve peak, $P_2$, has a peak 2 height, $H_{P2}$, a peak 2 peak wavelength, $P\lambda_{P2}$, a peak 2 area, $A_{P2}$, and a peak 2 full width half max, $FWHM_{P2}$; wherein $P\lambda_{P1}<P\lambda_{P2}$; and, wherein the peak 2 full width half max, $FWHM_{P2}$, of the second Gaussian emission curve is >100 nm. It has surprisingly been found that $Eu^{2+}$ activated inorganic red phosphors represented by formula (II) when prepared by the method of the present invention; wherein firing of the constituent raw material powder is performed in a firing container having an internal surface defining a cavity; wherein the internal surface, which contacts the raw material powder loaded into the cavity, is a virgin material; exhibit an overall emission band narrowing with a significant increase in brightness. It is believed that the increase in brightness is due, at least in part, to a structural modification of the $Eu^{2+}$ activated inorganic red phosphor produced by the method of the present invention through manipulation of the location and bonding environment of the $Eu^{2+}$ in the crystal structure, evinced by a phosphor peak 2 full width half max, $pFWHM_{P2}$, of <100 nm.

Preferably, the method of the present invention for manufacturing an $Eu^{2+}$ activated inorganic red phosphor, comprises: (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof; (ii) providing a mixture of starting materials for the preparation of the $Eu^{2+}$ activated inorganic phosphor, wherein the mixture of starting materials includes an initial source of $Eu^{2+}$ cations; (iii) loading the mixture of starting materials from step (ii) into the firing container, wherein the mixture of starting materials contacts the internal surface of the firing container; (iv) placing the loaded firing container from step (iii) into a furnace; (v) firing the mixture of starting materials under a reducing atmosphere in the furnace at a temperature of 1300 to 2000° C. (preferably, 1300 to 1850° C.; more preferably, 1400 to 1850° C.; most preferably, 1500 to 1850° C.) for a period of 2 to 36 hours (preferably, 4 to 24 hours; more preferably, 6 to 18 hours; most preferably 8 to 12 hours), then removing the firing container from the furnace; (vi) removing and grinding the contents of the firing container to provide a ground material, loading the ground material back into the firing container, and placing the reloaded firing container back into the furnace; (vii) firing the ground material under the reducing atmosphere in the furnace at a temperature of 1300 to 2000° C. (preferably, 1300 to 1850° C.; more preferably, 1400 to 1850° C.; most preferably, 1500 to 1850° C.) for a period of 2 to 36 hours (preferably, 4 to 24 hours; more preferably, 6 to 18 hours; most preferably 8 to 12 hours), then removing the firing container from the furnace; (viii) repeating steps (vi) through (vii) zero to three times; (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container; (x) placing loaded firing container containing the intermediate mixture into the furnace, firing the intermediate mixture under the reducing atmosphere in the furnace at a temperature of 1300 to 2000° C. (preferably, 1300 to 1850° C.; more preferably, 1400 to 1850° C.; most preferably, 1500 to 1850° C.) for a period of 2 to 36 hours (preferably, 4 to 24 hours; more preferably, 6 to 18 hours; most preferably 8 to 12 hours), and then removing the firing container from the furnace; (xi) removing and grinding the contents of the firing container to provide a ground substance; (xii) optionally, providing a further source of $Eu^{2+}$ cations; (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. (preferably, 1300 to 1850° C.; more preferably, 1400 to 1850° C.; most preferably, 1500 to 1850° C.) for a period of 2 to 36 hours (preferably, 4 to 24 hours; more preferably, 6 to 18 hours; most preferably 8 to 12 hours), and then removing the firing container from the furnace; (xix) repeating steps (xi) through (xiii) zero to three times; (xx) removing and grinding the contents of the firing container from step (xix) to provide an $Eu^{2+}$ activated inorganic red phosphor.

In the method of the present invention for manufacturing an $Eu^{2+}$ activated inorganic red phosphor, the firing container is selected to have an internal surface defining a cavity, wherein the internal surface is a virgin material selected from the group consisting of molybdenum, tungsten, tantalum, niobium, chromium, platinum, titanium, zirconium, lanthanum, yttrium, cerium and alloys thereof. Preferably, the firing container provided has a uniform composition throughout. More preferably, the firing container provided has a virgin material applied as a coating to form the internal surface of the firing container. Most preferably, the firing container provided is an insert or liner made of the virgin material. Preferably, the firing container is an insert or liner, wherein the insert or liner is made of a virgin material selected from the group consisting of molybdenum, tungsten, tantalum, niobium, chromium, platinum and alloys thereof. Preferably, the virgin material is selected from the group consisting of molybdenum and molybdenum alloyed with at least one of an oxide and a carbide; wherein the oxide is selected from the group consisting of titanium oxide, zirconium oxide, hafnium oxide, lanthanum oxide, tungsten oxide, rhenium oxide and yttrium oxide; and, wherein the carbide is selected from the group consisting of titanium carbide, zirconium carbide, hafnium carbide, lanthanum carbide, tungsten carbide, rhenium carbide, yttrium carbide, tantalum carbide and copper carbide. More preferably, the virgin material is molybdenum. Most preferably, the firing container is a liner, wherein the liner is made of molybdenum.

Preferably, in the method of the present invention for manufacturing an $Eu^{2+}$ activated inorganic red phosphor, the step of providing a mixture of starting materials in (ii) includes: (a) providing a source of a divalent cation M(II) (preferably, wherein the divalent cation M(II) is selected from the group consisting of at least one of Mg, Ca, Sr and Ba; more preferably, wherein the divalent cation M(II) is selected from the group consisting of at least one of Ca, Sr and Ba; still more preferably, wherein the divalent cation M(II) is selected from the group consisting of Ca and Sr; most preferably, wherein the divalent cation M(II) is Sr); (b) providing a source of Si;

(c) providing a source of N; and, (d) providing an initial source of $Eu^{2+}$ cations. Preferably, the step of providing a mixture of starting materials in (ii) further includes: (e) providing a source of C (preferably, wherein the source of C is an anionic source of C (i.e., $C^{4-}$)). Preferably, the step of providing a mixture of starting materials in (ii) further includes: (f) providing a source of a monovalent species M(I)(preferably, wherein the monovalent species M(I) is selected from the group consisting of at least one of Li, Na, K, F, Cl, Br and I; more preferably, wherein the monovalent species M(I) is selected from the group consisting of at least one of Li, Na and F; most preferably, wherein the monovalent species M(I) is selected from the group consisting of at least one of Li and F).

Most preferably, in the method of the present invention for manufacturing an $Eu^{2+}$ activated inorganic red phosphor, the step of providing a mixture of starting materials in (ii) includes: (a) providing a source of a divalent cation M(II) (preferably, wherein the divalent cation M(II) is selected from the group consisting of at least one of Mg, Ca, Sr and Ba; more preferably, wherein the divalent cation M(II) is selected from the group consisting of at least one of Ca, Sr and Ba; still more preferably, wherein the divalent cation M(II) is selected from the group consisting of Ca and Sr; most preferably, wherein the divalent cation M(II) is Sr); (b) providing a source of Si; (c) providing a source of N; (d) providing an initial source of $Eu^{2+}$ cations; (e) providing a source of C (preferably, wherein the source of C is an anionic source of C (i.e., $C^{4-}$)); and, (f) providing a source of a monovalent species M(I)(preferably, wherein the monovalent species M(I) is selected from the group consisting of at least one of Li, Na, K, F, Cl, Br and I; more preferably, wherein the monovalent species M(I) is selected from the group consisting of at least one of Li, Na and F; most preferably, wherein the monovalent species M(I) is selected from the group consisting of at least one of Li and F).

Given the teachings provided in this application, one of ordinary skill in the art will be able to select an appropriate mixture of starting materials for use in the method of the present invention to produce an $Eu^{2+}$ activated inorganic red phosphor. Materials included in the mixture of starting materials can include silicon nitride, silicon carbide, metal oxides, metal halides, metal nitrides and metals in molar ratios selected to provide a given target $Eu^{2+}$ activated inorganic red phosphor compositions. Preferred elements contained in the product $Eu^{2+}$ activated inorganic red phosphor and corresponding starting materials are listed in TABLE 1.

TABLE 1

| Elements | Starting materials |
|---|---|
| Li, Na, K, F, Cl, Br, I | metals, nitrides, silicides, amides, azides, halides, carbides, oxides and carbonates |
| Ca, Sr, Ba, Mg | nitrides, metals, silicides, alloys, carbides, amides, azides, oxides and carbonates |
| Si | silicon nitride ($Si_3N_4$), silicon oxynitride, silicon, silicon carbide, silicide, silicon amide, silicon carbodiimide, silicon oxide |
| Al | Aluminum nitride, aluminum oxynitride, aluminum oxide, aluminum carbide, aluminum carbonitride, aluminum metal, aluminum halide |
| B | boron nitride, boron carbide, boron oxide, boric acid |
| N | nitride, nitrogen gas, ammonia gas, amide, azide |
| C | carbide, carbon nitrides, carbon, carbidonitride, Si—, C— and N— containing organic precursors, amide, azide (e.g., $Si(NCN)_2$, $C_2N_2H_4$, $C_2N_2(NH)$, $C_3N_3(NH_2)_3$) |
| $Eu^{2+}$ | europium nitride, europium oxide, europium metal, europium halide, europium hydride, europium amide, europium azide |

Preferably, in the method of the present invention for manufacturing an $Eu^{2+}$ activated inorganic red phosphor, the mixture of starting materials provided in step (ii) and the firing conditions in steps (v) through (viii) are selected such that the intermediate in step (ix) is an inorganic luminescent compound represented by formula (I)

$$M(I)_{ic}M(II)_{ia}Si_5N_{ix}C_{iy}O_{iz}:Eu^{2+}{}_{ib} \qquad (I)$$

wherein M(I) is a monovalent species selected from the group consisting of Li, Na, K, F, Cl, Br and I (preferably, Li, Na and F; most preferably, Li and F); wherein M(II) is a divalent cation selected from the group consisting of at least one of Mg, Ca, Sr and Ba (preferably, Ca, Sr and Ba; more preferably, Ca and Sr; most preferably, Sr); wherein 1.7≤ia≤2 (preferably, 1.7≤ia≤1.999; more preferably, 1.8≤ia≤1.995; most preferably, 1.85≤ia≤1.97); 0≤ib≤0.1 (preferably, 0.001≤ib≤0.1; more preferably, 0.005≤ib≤0.08; most preferably, 0.02≤ib≤0.06); 0≤ic≤0.1; 5≤ix≤8 (preferably, 5.5≤ix≤7.8; more preferably, 6≤ix≤7.5; most preferably, 6.25≤ix≤7.25); 0≤iy≤1.5 (preferably, 0.005≤iy≤1.5; more preferably, 0.01≤iy≤1.25; most preferably, 0.02≤iy≤0.1); 0≤iz≤5 (preferably, 0.005≤iz≤5; more preferably, 0.01≤iz≤2.5; most preferably, 0.05≤iz≤0.5); (preferably, wherein iy≠iz); wherein the intermediate exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate first Gaussian emission curve peak, $iP_1$; wherein the intermediate first Gaussian emission curve peak, $iP_1$, has an intermediate peak 1 height, $iH_{P1}$ at an intermediate peak 1 peak wavelength, $iP\lambda_{P1}$; wherein the intermediate second Gaussian emission curve has an intermediate second Gaussian emission curve peak, $iP_2$; wherein the intermediate second Gaussian emission curve peak, $iP_2$, has an intermediate peak 2 height, $iH_{P2}$, at an intermediate peak 2 peak wavelength, $iP\lambda_{P2}$; wherein $iP\lambda_{P1} < iP\lambda_{P2}$; wherein the intermediate emission spectrum, $iES_{455}$, has an intermediate peak ratio, $iP_R$, of ≥1 (preferably, 1 to 10; more preferably, 1 to 5; most preferably, 1 to 2) as determined by the following equation $$iP_R = iH_{P1}/iH_{P2}.$$

Preferably, in the method of the present invention for manufacturing an $Eu^{2+}$ activated inorganic red phosphor, the mixture of starting materials provided in step (ii) and the firing conditions in steps (v) through (viii) are selected such that the intermediate in step (ix) is an inorganic luminescent compound represented by formula (I)

$$M(I)_{ic}M(II)_{ia}Si_5N_{ix}C_{iy}O_{iz}:EU^{2+}{}_{ib} \qquad (I)$$

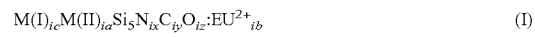

wherein M(I) is a monovalent species selected from the group consisting of Li, Na, K, F, Cl, Br and I (preferably, Li, Na and F; most preferably, Li and F); wherein M(II) is a divalent cation selected from the group consisting of Sr and a combination of Sr and at least one of Mg, Ca and Ba (most preferably, wherein M(II) is Sr); wherein 1.7≤ia≤2 (preferably, 1.7≤ia≤1.999; more preferably, 1.8≤ia≤1.995; most preferably, 1.85≤ia≤1.97); 0≤ib≤0.1 (preferably, 0.001≤ib≤0.1; more preferably, 0.005≤ib≤0.08; most preferably, 0.02≤ib≤0.06); 0≤ic≤0.1; 5≤ix≤8 (preferably, 5.5≤ix≤7.8; more preferably, 6≤ix≤7.5; most preferably, 6.25≤ix≤7.25); 0≤iy≤1.5 (preferably, 0.005≤iy≤1.5; more preferably, 0.01≤iy≤1.25; most preferably, 0.02≤iy≤0.1); 0≤iz≤5 (preferably, 0.005≤iz≤5; more preferably, 0.01≤iz≤2.5; most preferably, 0.05≤iz≤0.5); (preferably, wherein iy≠iz); wherein the intermediate exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate first Gaussian emission curve peak, $iP_1$; wherein the intermediate first Gaussian emission curve peak, $iP_1$, has an intermediate peak 1 height, $iH_{P1}$, at an intermediate peak 1 peak wavelength, $iP\lambda_{P1}$; wherein the intermediate second Gaussian emission curve has an intermediate second Gaussian emission curve peak, $iP_2$; wherein the intermediate second Gaussian emission curve peak, $iP_2$, has an intermediate peak 2 height, $iH_{P2}$, at an intermediate peak 2 peak wavelength, $iP\lambda_{P2}$; wherein $iP\lambda_{P1} < iP\lambda_{P2}$; wherein the intermediate emission spectrum, $iES_{455}$, has an intermediate peak ratio, $iP_R$, of ≥1 (preferably, 1 to 10; more preferably, 1 to 5; most preferably, 1 to 2) as determined by the following equation $$iP_R = iH_{P1}/iH_{P2}.$$

Preferably, in the method of the present invention for manufacturing an $Eu^{2+}$ activated inorganic red phosphor, the mixture of starting materials provided in step (ii) and the firing conditions in steps (v) through (viii) are selected such that the intermediate in step (ix) is an inorganic luminescent compound represented by formula (I)

$$M(I)_{ic}M(II)_{ia}Si_5N_{ix}C_{iy}O_{iz}:Eu^{2+}{}_{ib} \qquad (I)$$

wherein M(I) is a monovalent species selected from the group consisting of Li, Na, K, F, Cl, Br and I (preferably, Li, Na and F; most preferably, Li and F); wherein M(II) is a divalent cation selected from the group consisting of Sr and a combination of Sr and at least one of Mg, Ca and Ba (most preferably, wherein M(II) is Sr); wherein $1.7 \leq ia \leq 2$ (preferably, $1.7 \leq ia \leq 1.999$; more preferably, $1.8 \leq ia \leq 1.995$; most preferably, $1.85 \leq ia \leq 1.97$); $0 \leq ib \leq 0.1$ (preferably, $0.001 \leq ib \leq 0.1$; more preferably, $0.005 \leq ib \leq 0.08$; most preferably, $0.02 \leq ib \leq 0.06$); $0 \leq ic \leq 0.1$; $5 \leq ix \leq 8$ (preferably, $5.5 \leq ix \leq 7.8$; more preferably, $6 \leq ix \leq 7.5$; most preferably, $6.25 \leq ix \leq 7.25$); $0 \leq iy \leq 1.5$ (preferably, $0.005 \leq iy \leq 1.5$; more preferably, $0.01 \leq iy \leq 1.25$; most preferably, $0.02 \leq iy \leq 0.1$); $0 \leq iz \leq 5$ (preferably, $0.005 \leq iz \leq 5$; more preferably, $0.01 \leq iz \leq 2.5$; most preferably, $0.05 \leq iz \leq 0.5$); wherein $iy \neq iz$; wherein the intermediate exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate first Gaussian emission curve peak, $iP_1$; wherein the intermediate first Gaussian emission curve peak, $iP_1$, has an intermediate peak 1 height, $iH_{P1}$, at an intermediate peak 1 peak wavelength, $iP\lambda_{P1}$; wherein the intermediate second Gaussian emission curve has an intermediate second Gaussian emission curve peak, $iP_2$; wherein the intermediate second Gaussian emission curve peak, $iP_2$, has an intermediate peak 2 height, $iH_{P2}$, at an intermediate peak 2 peak wavelength, $iP\lambda_{P2}$; wherein $iP\lambda_{P1} < iP\lambda_{P2}$; wherein the intermediate emission spectrum, $iES_{455}$, has an intermediate peak ratio, $iP_R$, of ≥1 (preferably, 1 to 10; more preferably, 1 to 5; most preferably, 1 to 2) as determined by the following equation $$iP_R = iH_{P1}/iH_{P2}.$$

Preferably, the intermediate, in the method of the present invention, exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate peak 1 peak wavelength, $iP\lambda_{P1}$; wherein the intermediate second Gaussian emission curve has an intermediate peak 2 peak wavelength, $iP\lambda_{P2}$, and, an intermediate full width at half max, $iFWHM_{P2}$, of <100 nm (preferably, ≤99 nm; more preferably, ≤98 nm; most preferably, ≤97 nm); wherein $iP\lambda_{P1} < iP\lambda_{P2}$.

Preferably, the intermediate, in the method of the present invention, exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate peak 1 peak wavelength, $iP\lambda_{P1}$, and an intermediate peak 1 area, $iA_{P1}$; wherein the intermediate second Gaussian emission curve has an intermediate peak 2 peak wavelength, $iP\lambda_{P2}$, and an intermediate peak 2 area, $iA_{P2}$; wherein $iP\lambda_{P1} < iP\lambda_{P2}$; and, wherein the intermediate emission spectrum, $iES_{455}$, has an intermediate area ratio, $iA_R$, of ≥0.6 (preferably, 0.6 to 10; more preferably, 0.6 to 5; most preferably, 0.6 to 1) as determined by the following equation $$iA_R = iA_{P1}/iA_{P2}.$$

Preferably, the intermediate, in the method of the present invention, exhibits an intermediate emission spectrum, $iES_{453}$, upon excitation with monochromatic light having a wavelength of 453 nm; wherein the intermediate emission spectrum, $iES_{453}$, has an intermediate overall full width at half max, $iFWHM_{overall}$, of <90 nm (preferably, <85 nm) coupled with a $CIE_X$ of >0.625 (preferably, >0.627; more preferably, >0.630) based on the CIE 1931 Chromaticity Diagram. More preferably, the intermediate exhibits an intermediate emission spectrum, $iES_{453}$, upon excitation with monochromatic light having a wavelength of 453 nm; wherein the intermediate emission spectrum, $iES_{453}$, has an intermediate overall full width at half max, $iFWHM_{overall}$, of <90 nm (preferably, <85 nm) coupled with a $CIE_X$ of >0.625 (preferably, >0.627; more preferably, >0.630) based on the CIE 1931 Chromaticity Diagram; and, wherein the intermediate exhibits a high luminescence (preferably, lumens≥210%; more preferably, ≥220%; most preferably, ≥225%), as measured under the conditions set forth in the Examples.

Preferably, the intermediate, in the method of the present invention, exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has a intermediate first Gaussian emission curve peak, $iP_1$; wherein the intermediate first Gaussian emission curve peak, $iP_1$, has an intermediate peak 1 height, $iH_{P1}$, at an intermediate peak 1 peak wavelength, $iP\lambda_{P1}$, and an intermediate peak 1 area, $iA_{P1}$; wherein the intermediate second Gaussian emission curve has an intermediate second Gaussian emission curve peak, $iP_2$; wherein the intermediate second Gaussian emission curve peak, $iP_2$, has an intermediate peak 2 height, $iH_{P2}$, at an intermediate peak 2 peak wavelength, $iP\lambda_{P2}$, and an intermediate peak 2 area, $iA_{P2}$; wherein $iP\lambda_{P1} < iP\lambda_{P2}$; and, wherein the intermediate emission spectrum, $iES_{455}$, has an intermediate peak ratio, $iP_R$, of ≥1 (preferably, 1 to 10; more preferably, 1 to 5; most preferably, 1 to 2) as determined by the following equation $$iP_R = iH_{P1}/iH_{P2}$$

(preferably, wherein the intermediate further exhibits an intermediate area ratio, $iA_R$, of ≥0.6); and, wherein the elements in the intermediate can be in stoichiometric proportions or in non-stoichiometric proportions.

Preferably, in the method of the present invention for manufacturing an $Eu^{2+}$ activated inorganic red phosphor, the intermediate mixture provided in step (ix), the further source of $Eu^{2+}$ cations provided is step (xii), if any, and the firing conditions in steps (x) through (xix) are selected such that the $Eu^{2+}$ activated inorganic red phosphor provided comprises an inorganic compound represented by formula (II)

$$M(I)_{pc}M(II)_{pa}Si_5N_{px}C_{py}O_{pz}:Eu^{2+}_{pb} \qquad (II)$$

wherein M(I) is a monovalent species selected from the group consisting of Li, Na, K, F, Cl, Br and I (preferably, Li, Na and F; most preferably, Li and F); wherein M(II) is a divalent cation selected from the group consisting of at least one of Mg, Ca, Sr and Ba (preferably, Ca, Sr and Ba; more preferably, Ca and Sr; most preferably, Sr); wherein 1.7≤pa≤2 (preferably, 1.7≤pa≤1.999; more preferably, 1.8≤pa≤1.995; most preferably, 1.85≤pa≤1.97); 0≤pb≤0.3 (preferably, 0.001≤pb≤0.3; more preferably, 0.005≤pb≤0.2; most preferably, 0.03≤pb≤0.1); 0≤pc≤0.1; 5≤px≤8 (preferably, 5.5≤px≤7.8; more preferably, 6≤px≤7.5; most preferably, 6.25≤px≤7.25); 0≤py≤1.5 (preferably, 0.005≤py≤1.5; more preferably, 0.01≤py≤1.25; most preferably, 0.02≤py≤0.1); 0≤pz≤5 (preferably, 0.005≤pz≤5; more preferably, 0.01≤pz≤2.5; most preferably, 0.05≤pz≤0.5); (preferably, wherein py≠pz); wherein the $Eu^{2+}$ activated inorganic red phosphor exhibits a phosphor emission spectrum, $pES_{455}$, upon excitation with monochromatic light having a wavelength of 455 nm; wherein the phosphor emission spectrum, $pES_{455}$, is resolvable into a phosphor first Gaussian emission curve and a phosphor second Gaussian emission curve; wherein the phosphor first Gaussian emission curve has a phosphor first Gaussian emission curve peak, $pP_1$; wherein the phosphor first Gaussian emission curve peak, $pP_1$, has a phosphor peak 1 height, $pH_{P1}$, at a phosphor peak 1 peak wavelength, $pP\lambda_{P1}$; wherein the phosphor second Gaussian emission curve has a phosphor second Gaussian emission curve peak, $pP_2$; wherein the phosphor second Gaussian emission curve peak, $pP_2$, has a phosphor peak 2 height, $pH_{P2}$, a phosphor peak 2 peak wavelength, $pP\lambda_{P2}$, and a phosphor full width at half max, $pFWHM_{P2}$; wherein $pP\lambda_{P1} < pP\lambda_{P2}$; and, wherein the phosphor full width at half max, $pFWHM_{P2}$, is <100 nm (preferably, ≤99 nm; more preferably, ≤98 nm; most preferably, ≤97 nm). Preferably, wherein the phosphor emission spectrum, $pES_{455}$, of the $Eu^{2+}$ activated inorganic red phosphor further exhibits a $CIE_X$ of ≥0.637 (preferably, ≥0.638; more preferably, ≥0.639) based on the CIE 1931 Chromaticity Diagram.

Preferably, in the method of the present invention for manufacturing an $Eu^{2+}$ activated inorganic red phosphor, the intermediate mixture provided in step (ix), the further source of $Eu^{2+}$ cations provided is step (xii), if any, and the firing conditions in steps (x) through (xix) are selected such that the $Eu^{2+}$ activated inorganic red phosphor provided comprises an inorganic compound represented by formula (II)

$$M(I)_{pc}M(II)_{pa}Si_5N_{px}C_{py}O_{pz}:Eu^{2+}_{pb} \qquad (II)$$

wherein M(I) is a monovalent species selected from the group consisting of Li, Na, K, F, Cl, Br and I (preferably, Li, Na and F; most preferably, Li and F); wherein M(II) is a divalent cation selected from the group consisting of Sr and a combination of Sr and at least one of Mg, Ca and Ba (most preferably, wherein M(II) is Sr); wherein 1.7≤pa≤2 (preferably, 1.7≤pa≤1.999; more preferably, 1.8≤pa≤1.995; most preferably, 1.85≤pa≤1.97); 0≤pb≤0.3 (preferably, 0.001≤pb≤0.3; more preferably, 0.005≤pb≤0.2; most preferably, 0.03≤pb≤0.1); 0≤pc≤0.1; 5≤px≤8 (preferably, 5.5≤px≤7.8; more preferably, 6≤px≤7.5; most preferably, 6.25≤px≤7.25); 0≤py≤1.5 (preferably, 0.005≤py≤1.5; more preferably, 0.01≤py≤1.25; most preferably, 0.02≤py≤0.1); 0≤pz≤5 (preferably, 0.005≤pz≤5; more preferably, 0.01≤pz≤2.5; most preferably, 0.05≤pz≤0.5); (preferably, wherein py≠pz); wherein the $Eu^{2+}$ activated inorganic red phosphor exhibits a phosphor emission spectrum, $pES_{455}$, upon excitation with monochromatic light having a wavelength of 455 nm; wherein the phosphor emission spectrum, $pES_{455}$, is resolvable into a phosphor first Gaussian emission curve and a phosphor second Gaussian emission curve; wherein the phosphor first Gaussian emission curve has a phosphor first Gaussian emission curve peak, $pP_1$; wherein the phosphor first Gaussian emission curve peak, $pP_1$, has a phosphor peak 1 height, $pH_{P1}$, at a phosphor peak 1 peak wavelength, $pP\lambda_{P1}$; wherein the phosphor second Gaussian emission curve has a phosphor second Gaussian emission curve peak, $pP_2$; wherein the phosphor second Gaussian emission curve peak, $pP_2$, has a phosphor peak 2 height, $pH_{P2}$, a phosphor peak 2 peak wavelength, $pP\lambda_{P2}$, and a phosphor full width at half max, $pFWHM_{P2}$; wherein $pP\lambda_{P1} < pP\lambda_{P2}$; and, wherein the phosphor full width at half max, $pFWHM_{P2}$, is <100 nm (preferably, ≤99 nm; more preferably, ≤98 nm; most preferably, ≤97 nm). Preferably, wherein the phosphor emission spectrum, $pES_{455}$, of the $Eu^{2+}$ activated inorganic red phosphor further exhibits a $CIE_X$ of ≥0.637 (preferably, ≥0.638; more preferably, ≥0.639) based on the CIE 1931 Chromaticity Diagram.

Preferably, in the method of the present invention for manufacturing an $Eu^{2+}$ activated inorganic red phosphor, the intermediate mixture provided in step (ix), the further source of $Eu^{2+}$ cations provided is step (xii), if any, and the firing conditions in steps (x) through (xix) are selected such that the $Eu^{2+}$ activated inorganic red phosphor provided comprises an inorganic compound represented by formula (II)

$$M(I)_{pc}M(II)_{pa}Si_5N_{px}C_{py}O_{pz}:Eu^{2+}_{pb} \qquad (II)$$

wherein M(I) is a monovalent species selected from the group consisting of Li, Na, K, F, Cl, Br and I (preferably, Li, Na and F; most preferably, Li and F); wherein M(II) is a divalent cation selected from the group consisting of Sr and a combination of Sr and at least one of Mg, Ca and Ba (most preferably, wherein M(II) is Sr); wherein 1.7≤pa≤2 (preferably, 1.7≤pa≤1.999; more preferably, 1.8≤pa≤1.995; most preferably, 1.85≤pa≤1.97); 0≤pb≤0.3 (preferably, 0.001≤pb≤0.3; more preferably, 0.005≤pb≤0.2; most preferably, 0.03≤pb≤0.1); 0≤pc≤0.1; 5≤px≤8 (preferably, 5.5≤px≤7.8; more preferably, 6≤px≤7.5; most preferably, 6.25≤px≤7.25); 0≤py≤1.5 (preferably, 0.005≤py≤1.5; more preferably, 0.01≤py≤1.25; most preferably, 0.02≤py≤0.1); 0≤pz≤5 (preferably, 0.005≤pz≤5; more preferably, 0.01≤pz≤2.5; most preferably, 0.05≤pz≤0.5); wherein py≠pz; wherein the $Eu^{2+}$ activated inorganic red phosphor exhibits a phosphor emission spectrum, $pES_{455}$, upon excitation with monochromatic light having a wavelength of 455 nm; wherein the phosphor emission spectrum, $pES_{455}$, is resolvable into a phosphor first Gaussian emission curve and a phosphor second Gaussian emission curve; wherein the phosphor first Gaussian emission curve has a phosphor first Gaussian emission curve peak, $pP_1$; wherein the phosphor first Gaussian emission curve peak, $pP_1$, has a phosphor peak 1 height, $pH_{P1}$, at a phosphor peak 1 peak wavelength, $pP\lambda_{P1}$; wherein the phosphor second Gaussian emission curve has a phosphor second Gaussian emission curve peak, $pP_2$; wherein the phosphor second Gaussian emission curve peak, $pP_2$, has a phosphor peak 2 height, $pH_{P2}$, a phosphor peak 2 peak wavelength, $pP\lambda_{P2}$, and a phosphor full width at half max, $pFWHM_{P2}$; wherein $pP\lambda_{P1} < pP\lambda_{P2}$; and, wherein the phosphor full width at half max, $pFWHM_{P2}$, is <100 nm (preferably, ≤99 nm; more preferably, ≤98 nm; most preferably, ≤97 nm). Preferably, wherein the phosphor emission spectrum, $pES_{455}$, of the $Eu^{2+}$ activated inorganic phosphor further exhibits a $CIE_X$ of ≥0.637 (preferably, ≥0.638; more preferably, ≥0.639) based on the CIE 1931 Chromaticity Diagram.

Preferably, the $Eu^{2+}$ activated inorganic red phosphor, produced by the method of the present invention, exhibits a phosphor emission spectrum, $pES_{453}$, upon excitation with monochromatic light having a wavelength of 453 nm; wherein the phosphor emission spectrum, $pES_{453}$, has a phosphor overall full width at half max, $pFWHM_{overall}$, of ≤90 nm coupled with a $CIE_X$ of >0.637 (preferably, ≥0.638; more preferably, ≥0.639) based on the CIE 1931 Chromaticity Diagram. More preferably, the $Eu^{2+}$ activated inorganic red phosphor, produced by the method of the present invention, exhibits a phosphor emission spectrum, $pES_{453}$, upon excitation with monochromatic light having a wavelength of 453 nm; wherein the phosphor emission spectrum, $pES_{455}$, has a phosphor overall full width at half max, $pFWHM_{overall}$, of ≤90 nm coupled with a $CIE_X$ of >0.637 (preferably, ≥0.638; more preferably, ≥0.639) based on the CIE 1931 Chromaticity Diagram; and, wherein the $Eu^{2+}$ activated inorganic red phosphor exhibits a high luminescence (preferably, lumens≥210%), as measured under the conditions set forth in the Examples.

The $Eu^{2+}$ activated inorganic red phosphor, produced by the method of the present invention, can contain impurities. Preferably, the $Eu^{2+}$ activated inorganic red phosphor, produced by the method of the present invention, comprises: ≥80 wt % (more preferably, 80 to 100 wt %; still more preferably 90 to 100 wt %; yet still more preferably 95 to 100 wt %; most preferably 99 to 100 wt %) of the inorganic luminescent compound represented by formula (II); wherein the $Eu^{2+}$ activated inorganic red phosphor exhibits a phosphor emission spectrum, $pES_{455}$, upon excitation with monochromatic light having a wavelength of 455 nm; wherein the phosphor emission spectrum, $pES_{455}$, is resolvable into a phosphor first Gaussian emission curve and a phosphor second Gaussian emission curve; wherein the phosphor first Gaussian emission curve has a phosphor first Gaussian emission curve peak, $pP_1$; wherein the phosphor first Gaussian emission curve peak, $pP_1$, has a phosphor peak 1 height, $pH_{P1}$, a phosphor peak 1 peak wavelength, $pP\lambda_{P1}$, and a phosphor peak 1 area, $pA_{P1}$; wherein the phosphor second Gaussian emission curve has a phosphor second Gaussian emission curve peak, $pP_2$; wherein the phosphor second Gaussian emission curve peak, $pP_2$, has a phosphor peak 2 height, $pH_{P2}$, a phosphor peak 2 peak wavelength, $pP\lambda_{P2}$, a phosphor peak 2 area, $pA_{P2}$, and a phosphor peak 2 full width at half max, $pFWHM_{P2}$; wherein $pP\lambda_{P1} < pP\lambda_{P2}$; wherein the phosphor full width at half max, $pFWHM_{P2}$, is <100 nm (preferably, ≤99 nm; more preferably, ≤98 nm; most preferably, ≤97 nm); and, wherein the inorganic luminescent compound represented by formula (II) can be present as at least two different crystalline phases (preferably, wherein the inorganic luminescent compound represented by formula (II) is present as one substantially pure crystalline phase (more preferably, ≥98% of a particular crystalline phase; most preferably, ≥99% of a particular crystalline phase)).

Preferably, the $Eu^{2+}$ activated inorganic red phosphor, produced by the method of the present invention, maintains ≥70% (more preferably, ≥85%; most preferably, ≥90%) of its relative emission intensity at temperatures of 25 to 150° C. More preferably, the $Eu^{2+}$ activated inorganic red phosphor, produced by the method of the present invention, maintains ≥70% (more preferably, ≥85%; most preferably, ≥90%) of its relative emission intensity at temperatures of 25 to 200° C. Most preferably, the $Eu^{2+}$ activated inorganic red phosphor, produced by the method of the present invention, maintains ≥70% (more preferably, ≥85%; most preferably, ≥90%) of its relative emission intensity at temperatures of 25 to 250° C.

Preferably, the $Eu^{2+}$ activated inorganic red phosphor, produced by the method of the present invention, exhibits low thermal quenching. More preferably, the $Eu^{2+}$ activated inorganic red phosphor, produced by the method of the present invention, exhibits thermal quenching of ≤5% at 150° C. Most preferably, the $Eu^{2+}$ activated inorganic red phosphor, produced by the method of the present invention, exhibits thermal quenching of ≤5% at 150° C. and ≤15% at 250° C.

Preferably, the $Eu^{2+}$ activated inorganic red phosphor, produced by the method of the present invention, exhibits a median diameter of 2 to 50 microns (more preferably, 4 to 30 microns; most preferably, 5 to 20 microns).

Optionally, the method of the present invention for manufacturing an $Eu^{2+}$ activated inorganic red phosphor, further comprises: (xxi) washing the $Eu^{2+}$ activated inorganic red phosphor (preferably, washing in acid and deionized water at room temperature).

Preferably, the $Eu^{2+}$ activated inorganic red phosphor, produced by the method of the present invention is, ground, sieved, washed and dried, as necessary. Preferably, the $Eu^{2+}$ activated inorganic red phosphor is washed with acid followed by washing with deionized water. Preferably, the $Eu^{2+}$ activated inorganic red phosphor is ground, sieved to remove undesired fines and aggregates, and then dispersed in an aqueous acid solution (preferably a dilute acid having an acid concentration of 0.5 to 4 mol/L). The aqueous acid solution used is preferably selected from the group consisting of hydrochloric acid, hydrofluoric acid, sulfuric acid and nitric acid. Most preferably, the aqueous acid solution used is hydrochloric acid. The $Eu^{2+}$ activated inorganic red phosphor is then preferably further washed with deionized water. The washing with acid preferably removes starting materials, unwanted byproducts and flux components (e.g., halides and alkali Earths) that are not incorporated into the crystal structure of the $Eu^{2+}$ activated inorganic red phosphor product. The washed $Eu^{2+}$ activated inorganic red phosphor is then preferably dried. The dried $Eu^{2+}$ activated inorganic red phosphor is then preferably sieved to remove any fines and oversize material.

Optionally, the method of the present invention for manufacturing an $Eu^{2+}$ activated inorganic red phosphor, comprises: (xxii) providing a surface treating material; and, (xxiii) applying the surface treating material to a surface of the $Eu^{2+}$ activated inorganic red phosphor.

Surface treating materials suitable for use in the method of the present invention are preferably selected to provide at least one of enhanced stability and enhanced processability to the $Eu^{2+}$ activated inorganic red phosphor produced by the method of the present invention. The surface treatment can provide enhanced stability to the $Eu^{2+}$ activated inorganic red phosphor by imparting the $Eu^{2+}$ activated inorganic red phosphor with, for example, improved moisture resistance. The surface treatment can provide enhanced processability to the $Eu^{2+}$ activated inorganic red phosphor by enhancing the dispersibility of the $Eu^{2+}$ activated inorganic red phosphor in a given liquid carrier. Surface treatments include, for example, polymers (e.g., acrylic resins, polycarbonates, polyamides, polyethylenes and polyorganosiloxanes); metal hydroxides (e.g., magnesium hydroxide, aluminum hydroxide, silicon hydroxide, titanium hydroxide, zirconium hydroxide, tin hydroxide, germanium hydroxide, niobium hydroxide, tantalum hydroxide, vanadium hydroxide, boron hydroxide, antimony hydroxide, zinc hydroxide, yttrium hydroxide, bismuth hydroxide); metal oxides (e.g., magnesium oxide, aluminum oxide, silicon dioxide, titanium oxide, zirconium oxide, tin oxide, germanium oxide, niobium oxide, tantalum oxide, vanadium oxide, boron oxide, antimony oxide, zinc oxide, yttrium oxide, bismuth oxide); metal nitrides (e.g., silicon nitride, aluminum nitride); orthophosphates (e.g., calcium phosphate, barium phosphate, strontium phosphate); polyphosphates; combinations of alkali metal phosphates and alkaline-Earth metal phosphates with calcium salts (e.g., sodium phosphate with calcium nitrate); and, glass materials (e.g., borosilicates, phospho silicates, alkali silicates).

Optionally, the method of the present invention for manufacturing an $Eu^{2+}$ activated inorganic red phosphor, further comprises: providing a liquid carrier; and, dispersing the $Eu^{2+}$ activated inorganic red phosphor in the liquid carrier.

Liquid carriers suitable for use in the method of the present invention to form a phosphor composition are preferably selected to facilitate at least one of: the storage of the inorganic luminescent compound represented by formula (II) and the manufacture of a lighting apparatus (preferably, a pcLED device) incorporating the $Eu^{2+}$ activated inorganic red phosphor produced by the method of the present invention. The liquid carrier can be selected to be a fugitive substance (e.g., to be evaporated during processing). The liquid carrier can be selected to be a transformative substance (e.g., to be reacted from a flowable liquid to a non-flowable material).

Fugitive substances suitable for use as liquid carriers in the method of the present invention include, for example: non-polar solvents (e.g., pentane; cyclopentane; hexane; cyclohexane; benzene; toluene; 1,4-dioxane; chloroform; diethyl ether) and polar aprotic solvents (e.g., dichloromethane; tetrahydrofuran; ethyl acetate; acetone; dimethylformamide; acetonitrile; dimethyl sulfoxide; propylene carbonate).

Transformative liquid carriers suitable for use as liquid carriers in the method of the present invention include, for example: thermoplastic resins and thermosetting resins that undergo curing upon exposure to at least one of thermal energy and photonic energy. For example, transformative liquid media include: acrylic resins (e.g., (alkyl)acrylates, such as, polymethyl(meth)acrylate); styrene; styrene-acrylonitrile copolymers; polycarbonates; polyesters; phenoxy resins; butyral resins; polyvinyl alcohols; cellulose resins (e.g., ethyl cellulose, cellulose acetate, and cellulose acetate butyrate); epoxy resins; phenol resins; and silicone resins (e.g., polyorganosiloxanes).

Optionally, the method of the present invention for manufacturing an $Eu^{2+}$ activated inorganic red phosphor, further comprises: providing an additive; and, incorporating the additive into the phosphor composition.

Preferred additives for use in the method of the present invention include a dispersant. Preferably, the dispersant promotes the formation and stabilization of the phosphor composition. Preferred dispersants include, for example, titanium oxides, aluminum oxides, barium titanates and silicon oxides.

Some embodiments of the present invention will now be described in detail in the following Examples.

Comparative Examples C1-C6 and Examples 1-15

Preparation of Inorganic Luminescent Compounds

Comparative Examples C1-C6

The inorganic luminescent compound, generically represented by formula (II), in each of the Comparative Examples C1-C6 was prepared by a solid state reaction with the starting materials identified in TABLE 2. The starting materials were provided in powder form, were weighed out, physically mixed together and ground with a mortar and pestle in a glove box under a dried nitrogen atmosphere to form a uniform powder mixture. The powder mixture was then loaded in a crucible conventionally seasoned through repeated exposure to silicon sources at high temperature to form a metal silicide surface layer on the powder contacting surface of the crucible. The loaded crucible was then placed in a high temperature furnace under a flowing, high purity nitrogen/hydrogen ($N_2$/$H_2$) atmosphere. The powder mixture was then heated at a temperature of 1500 to 1850° C. for 8 to 12 hours in a high temperature furnace under the flowing $N_2/H_2$ atmosphere. The resulting powder was removed from the crucible, ground using a mortar and pestle under a dried nitrogen atmosphere to form a uniform powder mixture. The powder mixture was then reloaded into the crucible. The loaded crucible was then placed in the high temperature furnace under a flowing, high purity $N_2/H_2$ atmosphere and heated at a temperature of 1500 to 1850° C. for another 8 to 12 hours under the flowing $N_2/H_2$ atmosphere. The resulting powder was then removed from the crucible, ground using a mortar and pestle under a dried nitrogen atmosphere forming a uniform powder mixture. This powder mixture was then reloaded into the crucible. The loaded crucible was again placed in the high temperature furnace under a flowing, high purity $N_2/H_2$ atmosphere and heated at a temperature of 1500 to 1850° C. for another 8 to 12 hours under the flowing $N_2/H_2$ atmosphere. The resulting powder was then removed from the firing crucible, ground using a mortar and pestle, washed with acid and deionized water at room temperature, milled and then sieved using a 100 to 400 U.S. standard mesh to provide the inorganic luminescent compound.

Examples 1-11

The intermediate, represented by formula (I), in each of the Examples 1-11 was prepared by a solid state reaction with the starting materials identified in TABLE 2. The starting materials noted in TABLE 2 were provided in powder form. All of the starting materials were physically mixed together and ground using a mortar and pestle in a glove box under a dried nitrogen atmosphere to form a uniform powder mixture. The powder mixture was then loaded into a crucible, wherein the powder contacting surface of the crucible was virgin molybdenum (i.e., the powder contacting surface of the crucibles in each of Examples 1-11 were used in their as received condition from the crucible supplier, they were not seasoned through high temperature exposure to silicon prior to use). The loaded crucible was then placed in a high temperature furnace under a flowing, high purity nitrogen/hydrogen atmosphere. The powder mixture was then heated at a temperature of 1500 to 1850° C. for 8 to 12 hours in a high temperature furnace under the flowing $N_2/H_2$ atmosphere. The resulting powder was removed from the crucible, ground using a mortar and pestle to form a uniform powder mixture. The resulting powder mixture was then reloaded into the crucible. The loaded crucible was placed back in the high temperature furnace under the flowing $N_2/H_2$ atmosphere and heated at a temperature of 1500 to 1850° C. for another 8 to 12 hours under the flowing $N_2/H_2$ atmosphere. The resulting powder was then removed from the crucible, ground using a mortar and pestle, washed with acid and deionized water at room temperature, milled, and then sieved using a 100 to 400 U.S. standard mesh to provide an intermediate.

TABLE 2

| Ex # | $Sr_3N_2$ (g) | $Si_3N_4$ (g) | $Eu_2O_3$ (g) | SiC (g) |
|---|---|---|---|---|
| C1 | 143.227 | 147.650 | 5.247 | 14.067 |
| C2 | 143.227 | 147.650 | 5.247 | 14.067 |
| C3 | 143.227 | 147.650 | 5.247 | 14.067 |
| C4 | 143.365 | 147.688 | 5.064 | 14.071 |
| C5 | 143.365 | 147.688 | 5.064 | 14.071 |
| C6 | 143.365 | 147.688 | 5.064 | 14.071 |
| 1 | 143.090 | 147.612 | 5.431 | 14.064 |
| 2 | 143.090 | 147.612 | 5.431 | 14.064 |
| 3 | 143.090 | 147.612 | 5.431 | 14.064 |
| 4 | 143.090 | 147.612 | 5.431 | 14.064 |
| 5 | 143.090 | 147.612 | 5.431 | 14.064 |
| 6 | 143.090 | 147.612 | 5.431 | 14.064 |
| 7 | 143.090 | 147.612 | 5.431 | 14.064 |
| 8 | 143.090 | 147.612 | 5.431 | 14.064 |
| 9 | 143.365 | 147.689 | 5.064 | 14.071 |
| 10 | 143.549 | 147.740 | 4.818 | 14.076 |
| 11 | 143.733 | 147.791 | 4.573 | 14.081 |

Examples 12-15

$Eu^{2+}$ Activated Inorganic Red Phosphors According to Formula (II)

In Examples 12-15, the intermediate from Example 8-11, respectively, was combined with an additional charge of $Eu_2O_3$, as noted in TABLE 3, and the combination was then loaded back into the same crucible used in Example 8-11, respectively. The loaded crucible was placed back in the high temperature furnace and heated at a temperature of 1500 to 1850° C. for another 8 to 12 hours under the flowing $N_2/H_2$ atmosphere. The resulting powder was then removed from the crucible, ground using a mortar and pestle, washed with acid and deionized water at room temperature, milled, and then sieved using a 100 to 400 U.S. standard mesh to provide the $Eu^{2+}$ activated inorganic red phosphor.

TABLE 3

| Ex. | Product of Ex. | $Eu_2O_3$ (g) |
|---|---|---|
| 12 | 8 | 1.60 |
| 13 | 9 | 1.72 |
| 14 | 10 | 1.80 |
| 15 | 11 | 1.88 |

Inorganic Luminescent Compound Properties

The inorganic luminescent compounds from each of Comparative Examples C1-C6; the intermediates from each of Examples 1-7; and the $Eu^{2+}$ activated inorganic red phosphors from each of Examples 12-15 were then washed with an acid and deionized water at room temperature before performing the analyses described below to provide the data reported in TABLES 4 and 5.

The emission spectrum, $ES_{453}$, exhibited by each of the materials upon excitation with a light source (i.e., a light emitting diode (LED) lamp peaking at 453 mm was analyzed using an Ocean Optics USB4000 spectrometer available from Ocean Optics). The overall peak wavelength, $P\lambda_{overall}$, and the overall full width half maximum, $FWHM_{overall}$, of the emission spectrum, $ES_{453}$, determined for each material are reported in TABLE 4.

The emission spectrum, $ES_{453}$, color coordinates $CIE_X$ and $CIE_Y$ based on the CIE 1931 Chromaticity Diagram were calculated for each of the materials from the emission spectrum in the 380-780 nm wavelength range when excited by the emission from the LED light source. The color coordinates determined for the materials are reported in TABLE 4.

The internal quantum efficiency for each of the materials was determined by taking a sample of the material, packing the sample into a cell, mounting the cell in an integrating sphere and then exposing the materials to light emitted from a light source. Specifically, the light from the light source was guided through an optical tube, filtered through a narrow band pass filter to provide monochromatic light with a wavelength of 453 nm that was then directed at the material. The spectrum of light emitted from the material in the integrating sphere upon excitation with the light from the light source and the light reflected by the material were measured with an Ocean Optics USB 4000 spectrometer available from Ocean Optics. The conversion efficiencies (QE and Emission) and are reported relative to an internal standard. The luminous flux (lumens) was calculated for each of the materials from the emission spectrum, $ES_{453}$, in the 500-780 nm wavelength range when excited by the emission from the 453 nm LED light source and reported relative to an internal standard. Each of these values is reported in TABLE 4.

TABLE 4

| Ex # | $CIE_X$ | $CIE_Y$ | $FWHM_{overall}$ (nm) | $P\lambda_{overall}$ (nm) | Lumens (%) | QE (%) | Emission (%) |
|---|---|---|---|---|---|---|---|
| C1 | 0.635 | 0.364 | 88 | 623 | 201 | 104 | 117 |
| C2 | 0.634 | 0.365 | 87 | 622 | 206 | 104 | 118 |
| C3 | 0.634 | 0.365 | 87 | 623 | 205 | 104 | 117 |
| C4 | 0.639 | 0.36 | 90 | 626 | 186 | 97 | 113 |
| C5 | 0.637 | 0.362 | 92 | 626 | 187 | 102 | 114 |
| C6 | 0.637 | 0.363 | 92 | 626 | 188 | 103 | 114 |
| 1 | 0.628 | 0.371 | 80 | 618 | 238 | 105 | 118 |
| 2 | 0.629 | 0.371 | 80 | 618 | 237 | 105 | 118 |
| 3 | 0.629 | 0.371 | 80 | 618 | 232 | 103 | 116 |
| 4 | 0.628 | 0.372 | 80 | 618 | 238 | 105 | 118 |
| 5 | 0.627 | 0.373 | 80 | 618 | 243 | 108 | 119 |
| 6 | 0.632 | 0.367 | 83 | 620 | 221 | 103 | 117 |
| 7 | 0.632 | 0.367 | 83 | 620 | 221 | 103 | 118 |
| 12 | 0.639 | 0.361 | 86 | 622 | 211 | 104 | 123 |
| 13 | 0.639 | 0.361 | 86 | 623 | 214 | 105 | 124 |
| 14 | 0.639 | 0.360 | 85 | 622 | 211 | 104 | 123 |
| 15 | 0.639 | 0.360 | 86 | 622 | 215 | 106 | 125 |

The emission spectrum, $ES_{455}$, exhibited by each of the materials upon excitation with a light source (a 455 nm monochromatic laser) was further analyzed using a spectrometer having a spectral resolution of 1.5 nm. The emission spectrum, $ES_{455}$, exhibited by each of the materials upon excitation with the 455 nm monochromatic laser were individually fitted using GRAMS peak fitting software with 2 Gaussian bands to provide the data reported in TABLE 5 for each of the materials. Note that the data reported in TABLE 5 is the average derived from the analysis of duplicate samples of the materials.

TABLE 5

| Ex. | $H_{P1}$ (counts) | $H_{P2}$ (counts) | $P_R$ | $A_{P1}$ (area counts) | $A_{P2}$ (area counts) | $A_R$ | $FWHM_{P2}$ (nm) | $P\lambda_{P1}$ (nm) | $P\lambda_{P2}$ (nm) |
|---|---|---|---|---|---|---|---|---|---|
| C1 | 13547 | 15116 | 0.90 | 825813 | 1624486 | 0.51 | 100.93 | 611 | 644 |
| C2 | 60952 | 65361 | 0.93 | 3797007 | 7034778 | 0.54 | 100.98 | 611 | 643 |
| C3 | 33748 | 36217 | 0.93 | 2078345 | 3890430 | 0.53 | 100.89 | 611 | 643 |
| C4 | 5753 | 6215 | 0.93 | 349243 | 675636 | 0.52 | 102.13 | 614 | 646 |
| C5 | 12370 | 14186 | 0.87 | 760791 | 1562385 | 0.49 | 103.42 | 614 | 645 |
| C6 | 12858 | 15835 | 0.81 | 765238 | 1734731 | 0.44 | 102.92 | 613 | 645 |
| 1 | 9623 | 7863 | 1.22 | 589674 | 807836 | 0.73 | 96.52 | 610 | 640 |
| 2 | 6291 | 5267 | 1.19 | 382523 | 541721 | 0.71 | 96.62 | 610 | 640 |
| 3 | 19666 | 15449 | 1.27 | 1224946 | 1586536 | 0.77 | 96.48 | 610 | 640 |
| 4 | 6414 | 5238 | 1.22 | 390296 | 536812 | 0.73 | 96.28 | 610 | 640 |
| 5 | 6003 | 4791 | 1.25 | 370521 | 492514 | 0.75 | 96.57 | 610 | 640 |
| 6 | 9559 | 8656 | 1.10 | 585053 | 904371 | 0.65 | 98.15 | 611 | 642 |
| 7 | 19018 | 17227 | 1.10 | 1172094 | 1806058 | 0.65 | 98.48 | 611 | 642 |
| 12 | 9805 | 10247 | 0.96 | 566868 | 1064248 | 0.53 | 97.57 | 612 | 644 |
| 13 | 6273 | 6612 | 0.95 | 361372 | 687416 | 0.53 | 97.66 | 613 | 644 |
| 14 | 6077 | 6490 | 0.94 | 348264 | 675577 | 0.52 | 97.79 | 613 | 644 |
| 15 | 17724 | 18068 | 0.98 | 1034122 | 1875788 | 0.55 | 97.53 | 612 | 644 |
| 16 | 9303 | 10211 | 0.91 | 532982 | 1063325 | 0.50 | 97.83 | 613 | 645 |

We claim:

1. A method of manufacturing an $Eu^{2+}$ activated inorganic red phosphor, comprising:
   (i) providing a firing container having an internal surface defining a cavity; wherein the internal surface is a virgin material selected from the group consisting of molybdenum, tungsten, tantalum, niobium, chromium, platinum, titanium, zirconium, lanthanum, yttrium, cerium and alloys thereof;
   (ii) providing a mixture of starting materials for the preparation of the $Eu^{2+}$ activated inorganic phosphor, wherein the mixture of starting materials includes an initial source of $Eu^{2+}$ cations;
   (iii) loading the mixture of starting materials from step (ii) into the firing container, wherein the mixture of starting materials contacts the internal surface of the firing container;
   (iv) placing the loaded firing container from step (iii) into a furnace;
   (v) firing the mixture of starting materials under a reducing atmosphere in the furnace at a temperature of 1300 to 2000° C. for a period of 2 to 36 hours, then removing the firing container from the furnace;
   (vi) removing and grinding the contents of the firing container to provide a ground material, loading the ground material back into the firing container, and placing the reloaded firing container back into the furnace;
   (vii) firing the ground material under the reducing atmosphere in the furnace at a temperature of 1300 to 2000° C. for a period of 2 to 36 hours, then removing the firing container from the furnace;
   (viii) repeating steps (vi) through (vii) zero to three times;
   (ix) removing and grinding the contents of the firing container from step (viii) to provide an intermediate, providing an additional source of $Eu^{2+}$ cations, mixing the ground intermediate and the additional source of $Eu^{2+}$ cations to provide an intermediate mixture, and loading the intermediate mixture into the firing container;
   (x) placing loaded firing container containing the intermediate mixture into the furnace, firing the intermediate mixture under the reducing atmosphere in the furnace at a temperature of 1300 to 2000° C. for a period of 2 to 36 hours, and then removing the firing container from the furnace;
   (xi) removing and grinding the contents of the firing container to provide a ground substance;
   (xii) optionally, providing a further source of $Eu^{2+}$ cations;
   (xiii) mixing the ground substance from step (xi) with any further source of $Eu^{2+}$ cations from step (xii) to provide a substance mixture, loading the substance mixture back into the firing container from step (xi), placing the firing container containing the substance mixture into the furnace, firing the substance mixture under the reducing atmosphere in the furnace at a temperature of 1300 to 2000° C. for a period of 2 to 36 hours, and then removing the firing container from the furnace;
   (xix) repeating steps (xi) through (xiii) zero to three times;
   (xx) removing and grinding the contents of the firing container from step (xix) to provide an $Eu^{2+}$ activated inorganic red phosphor;
   wherein the mixture of starting materials provided in step (ii) and the firing conditions in steps (v) through (viii) are selected such that the intermediate in step (ix) is an inorganic luminescent compound represented by formula (I)

$$M(I)_{ic}M(II)_{ia}Si_5N_{ix}C_{iy}O_{iz}:Eu^{2+}{}_{ib} \qquad (I)$$

wherein M(I) is a monovalent species selected from the group consisting of Li, Na, K, F, Cl, Br and I;
wherein M(II) is a divalent cation selected from the group consisting of at least one of Mg, Ca, Sr and Ba;
wherein $1.7 \le ia \le 2$; $0 < ib \le 0.1$; $0 \le ic \le 0.1$; $5 \le ix \le 8$; $0 \le iy \le 1.5$; $0 \le iz \le 5$;
wherein the intermediate exhibits an intermediate emission spectrum, $iES_{455}$, upon excitation with monochromatic light having a wavelength of 455 nm; wherein the intermediate emission spectrum, $iES_{455}$, is resolvable into an intermediate first Gaussian emission curve and an intermediate second Gaussian emission curve; wherein the intermediate first Gaussian emission curve has an intermediate first Gaussian emission curve peak, $iP_1$; wherein the intermediate first Gaussian emission curve peak, $iP_1$, has an intermediate peak 1 height, $iH_{P1}$, at an intermediate peak 1 peak wavelength, $i\lambda_{P1}$; wherein the intermediate second Gaussian emission curve has an intermediate second Gaussian emission curve peak, $iP_2$; wherein the intermediate second Gaussian emission curve peak, $iP_2$, has an intermediate peak 2 height, $iH_{P2}$, at an intermediate peak 2 peak wavelength, $i\lambda_{P2}$;

wherein $iP\lambda_{P1} < iP\lambda_{P2}$; wherein the intermediate emission spectrum, $iES_{455}$, has an intermediate peak ratio, $iP_R$, of $>1$ as determined by the following equation $$iP_R = iH_{P1}/iH_{P2};$$

wherein the intermediate mixture provided in step (ix), the further source of $Eu^{2+}$ cations provided is step (xii), if any, and the firing conditions in steps (x) through (xix) are selected such that the $Eu^{2+}$ activated inorganic red phosphor provided comprises an inorganic compound represented by formula (II)

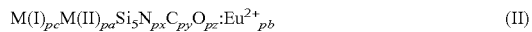

wherein M(I) is a monovalent species selected from the group consisting of Li, Na, K, F, Cl, Br and I;
wherein M(II) is a divalent cation selected from the group consisting of at least one of Mg, Ca, Sr and Ba;
wherein $1.7 \leq pa \leq 2$; $0 < pb \leq 0.3$; $0 \leq pc \leq 0.1$; $5 \leq px \leq 8$; $0 \leq py \leq 1.5$; $0 \leq pz \leq 5$;
wherein the $Eu^{2+}$ activated inorganic phosphor exhibits a phosphor emission spectrum, $pES_{455}$, upon excitation with monochromatic light having a wavelength of 455 nm; wherein the phosphor emission spectrum, $pES_{455}$, is resolvable into a phosphor first emission curve and a phosphor second emission curve, wherein the phosphor second emission curve has a phosphor full width at half max, $pFWHM_{P2}$, of $<100$ nm.

2. The method of claim 1, further comprising:
(xxi) washing the $Eu^{2+}$ activated inorganic red phosphor.

3. The method of claim 2, further comprising:
(xxii) providing a surface treating material; and,
(xxiii) applying the surface treating material to a surface of the $Eu^{2+}$ activated inorganic red phosphor to produce a surface treated red phosphor.

4. The method of claim 2, further comprising:
providing a liquid carrier; and,
dispersing the $Eu^{2+}$ activated inorganic red phosphor in the liquid carrier to form a phosphor composition.

5. The method of claim 4, further comprising:
providing a dispersant; and,
incorporating the dispersant into the phosphor composition.

* * * * *